UNITED STATES PATENT OFFICE.

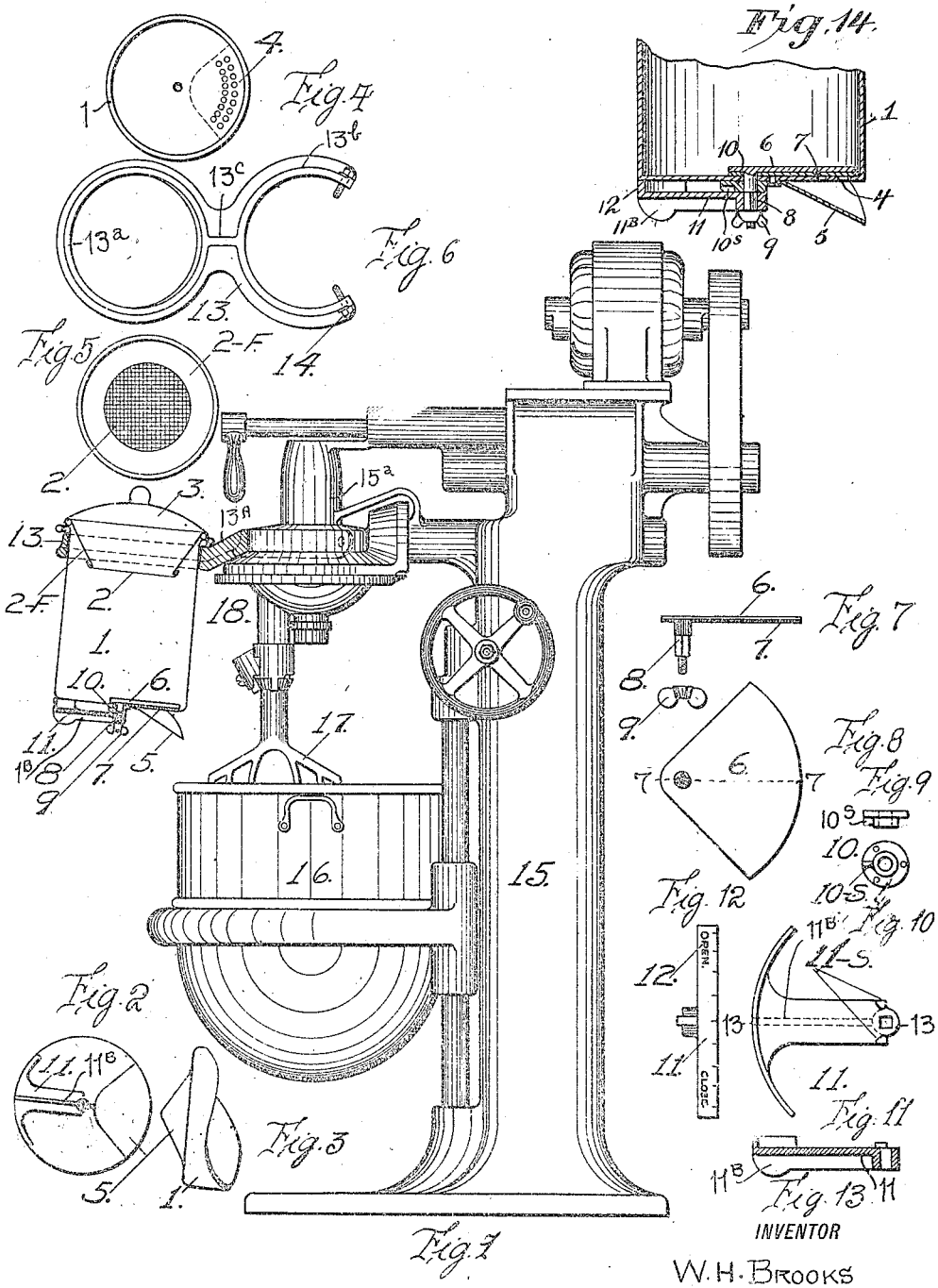
W. H. BROOKS.
ATTACHMENT FOR DOUGH MIXERS.
APPLICATION FILED APR. 25, 1917.
1,286,928. Patented Dec. 10, 1918.
INVENTOR
W. H. BROOKS

WILLIAM HAROLD BROOKS, OF SAN JOSE, CALIFORNIA.

ATTACHMENT FOR DOUGH-MIXERS.

1,286,928.    Specification of Letters Patent.    Patented Dec. 10, 1918.

Application filed April 25, 1917. Serial No. 164,587.

*To all whom it may concern:*

Be it known that I, WILLIAM H. BROOKS, a citizen of Great Britain, residing at San Jose, in the county of Santa Clara and State of California, have invented certain new and useful Improvements in Attachments for Dough-Mixers, of which the following is a specification, reference being had to the accompanying drawings.

This invention relates to dough mixing machines, and particularly to an attachment therefor designed to support a receptacle from which the contents may be discharged into a mixing bowl.

One object of my invention is the provision of an attachment of this character, which is adapted to be applied to machines for mixing bread dough or cake dough, and designed to do away with the necessity of the material which is to be mixed with the batter being manually poured into the mixing bowl.

A further object of the invention is to provide means whereby the passage of material into the mixing bowl may be controlled and regulated.

A further object is to provide a receptacle for containing material which is to be mixed with the batter, provide a holder therefor which may be engaged with the dough mixing machine, and provide means for straining the material as it is poured into said receptacle.

A further object is to provide a device of this character which is so constructed that all the parts may be disassembled so as to permit the device to be thoroughly cleansed.

Other objects will appear in the course of the following description.

My invention is illustrated in the accompanying drawings in which:—

Figure 1 is an elevation of an ordinary type of dough mixing machine, the receptacle and the receptacle holder being shown in section;

Fig. 2 is a bottom plan view of the receptacle;

Fig. 3 is a fragmentary elevation thereof showing the spout;

Fig. 4 is a top plan view of the receptacle with the cover and strainer removed and with the valve removed;

Fig. 5 is a top plan view of the strainer;

Fig. 6 is a top plan view of the receptacle holder;

Fig. 7 is a sectional view on the line 7—7 of Fig. 8;

Fig. 8 is a top plan view of the valve controlling the discharge of material from the receptacle;

Fig. 9 is a side elevation of the journal bearing for the valve stem;

Fig. 10 is an underside plan view thereof;

Fig. 11 is a top plan view of the handle for controlling the valve;

Fig. 12 is an end elevation thereof;

Fig. 13 is a section on the line 13—13 of Fig. 11;

Fig. 14 is an enlarged diametrical sectional view through the bottom of the container 1.

Referring to these drawings, 15 designates the standard or support of any ordinary dough mixing machine, which includes the bowl 16 and the beater 17, which is operatively mounted upon a rotatable shaft 18 driven by gearing from a motor, in the usual manner. It is not believed necessary to describe in detail the various parts of this machine, inasmuch as it is of a well known type and forms no part of my present invention. My invention relates to means for supporting a receptacle 1 upon a dough mixing machine in such a position that the contents of the receptacle will be discharged into the bowl 16.

The receptacle 1 is open at its upper end, but at its lower end is provided with a plurality of perforations 4. Preferably these perforations 4 are arranged in rows, there being as many rows as possible of varying sizes to suit various fluids or mixtures. Removably disposed in the upper end of the receptacle is a funnel $2^F$ having at its lower end a strainer 2. The upper end of the receptacle is closed by a cover 3. Below the perforations 4 of the receptacle is arranged a spout 5, which extends downward and which is so disposed as to discharge the material passing through the holes 4 into the bowls 16.

The receptacle is supported by means of a support 13 composed of an annulus $13^a$ adapted to receive the receptacle 1, and two conjoined curved arms $13^b$ which are adapted to partially surround the housing $15^a$ inclosing the gearing transmitting power to the shaft 18, these arms $13^b$ being provided at their extremities with set screws 14 whereby the holder 13 may be held upon the housing. It is to be understood that the arms $13^b$ of the holder 13 may be of such form as to fit any specific dough or cake mixer, of whatever make or style. It will be noted from Fig. 1 that the annular portion 13ª is joined to the arms 13ᵇ by an intermediate web 13ᶜ and that this web is downwardly inclined from the arms 13ᵇ and that the annulus 13ª is not disposed in a horizontal plane when the holder is in position on the machine, but is upwardly inclined so that the receptacle 1 when in place within the holder, is tilted so that its contents will gravitate toward the openings 4.

For the purpose of controlling the outlet of material from the receptacle 1 through the openings 4, I provide a segmental valve 6, which upon its under side is provided with a layer 7 of rubber or other soft material. This valve at one corner is provided with the downwardly extending stem 8, which is screw-threaded at its outer end, many sided and preferably square in cross section at its middle portion, and round at that portion which is disposed adjacent the valve. Connecting the screw-threaded portion of the stem is a wing nut 9. Mounted upon the under face of the bottom of the receptacle 1 is a bearing collar 10 having a central hub and a radially extending stop 10ˢ. The stem 8 passes through this bearing so that the round portion of the stem operates within the bearing and connected to the square portion of the stem is a handle 11. This handle at one end is formed with a square opening to receive the squared portion of the stem 8 and with two stops diametrically disposed at this end of the handle and designated 11ˢ which coact with the stop 10ˢ. The free end of the handle is formed with an arcuate flange 11 having thereon graduations 12. Preferably on one end of the flange is the word "Open" and at the opposite end the word "Close." The body of the handle is formed with a downwardly extending, medially disposed flange 11ᴮ which forms the means whereby the handle may be gripped and shifted.

In the practical use of this invention, the material which is to be mixed with the batter in the bowl 16, is poured into the receptacle 1 and passes through the strainer 2. Then the valve 6 is opened to any desired degree, depending upon the rapidity with which it is desired to discharge the contents of the receptacle. The valve may be fully opened, or only partly opened. The contents of the receptacle then pass downward gradually through the perforations in the bottom and are discharged by means of the spout 5 into the mixing bowl. It will be obvious that the contents of the receptacle may be discharged very slowly through a relatively long period of time or discharged relatively quickly. The holder does away with the necessity of an operator standing beside the bowl 17 and discharging the receptacle into the bowl and waiting there until the contents of the receptacle are fully discharged. This provides for a more complete mixing of the material with the dough and of more uniform mixing.

While I have illustrated a construction which I have found to be very effective in practice, it is obvious that many minor changes might be made, without departing from the spirit of the invention.

Having thus described my invention, what I claim is:—

1. An attachment for dough mixing machines including a receptacle having perforations in one portion of its bottom, the remainder of the bottom being imperforate, a spout disposed below the perforated portion of the bottom, a valve resting on the bottom and rotatable thereover and adapted to overlie all or a portion of the perforated portion of the bottom, said valve having a stem formed with a circular portion, a succeeding many sided portion and a succeeding screw-threaded portion, a bearing mounted on the bottom and through which the circular portion of the stem passes, said bearing having limiting stops formed upon it, a handle having a many sided opening to receive the many sided portion of the stem, and a nut engaging the screw-threaded portion of the stem and holding the handle upon the stem, said handle bearing against said bearing and being limited in its movement by said stops.

2. An attachment for dough mixing machines including a receptacle having a bead at its upper end whereby it may be engaged with a holder, the lower end of the receptacle having a plurality of perforations at one portion thereof, a valve disposed on the bottom of the receptacle and movable into position to wholly or partially overlie the perforated portion of the receptacle and having a valve stem passing through the bottom of the receptacle, a handle attached to said stem, the handle providing means whereby the valve may be opened to a greater or less degree and indicating the position of the valve, a hopper removably disposed in the upper portion of the receptacle and resting upon the upper edge thereof and having a strainer, and a cover engaging over the hopper and the upper edge of the receptacle.

In testimony whereof I hereunto affix my signature in the presence of two witnesses.

WILLIAM HAROLD BROOKS.

Witnesses:
L. SCHNEIDER,
ISABEL L. CHARLES.